(12) United States Patent
Liu

(10) Patent No.: US 10,345,659 B2
(45) Date of Patent: Jul. 9, 2019

(54) ARRAY SUBSTRATE AND LIQUID CRYSTAL DISPLAY PANEL

(71) Applicant: Wuhan China Star Optoelectronics Technology Co., Ltd., Wuhan, Hubei (CN)

(72) Inventor: Yuanfu Liu, Guangdong (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 15/916,435

(22) Filed: Mar. 9, 2018

(65) Prior Publication Data

US 2019/0064614 A1    Feb. 28, 2019

Related U.S. Application Data

(63) Continuation of application No. PCT/CN2017/114018, filed on Nov. 30, 2017.

(30) Foreign Application Priority Data

Aug. 31, 2017    (CN) .......................... 2017 1 0771654

(51) Int. Cl.
     *G02F 1/1362*      (2006.01)
(52) U.S. Cl.
     CPC .. *G02F 1/136204* (2013.01); *G02F 1/136286* (2013.01); *G02F 2202/22* (2013.01)

(58) Field of Classification Search
     CPC ....................... G02F 1/136204; H01L 27/1244
     See application file for complete search history.

(56) References Cited

U.S. PATENT DOCUMENTS

2010/0165226 A1*   7/2010   Lee ................... G02F 1/133351
                                                           349/40
2014/0367705 A1* 12/2014   Bibl ........................ H01L 33/44
                                                           257/88

FOREIGN PATENT DOCUMENTS

| CN | 101145567 A | 3/2008 |
| CN | 101825821 A | 9/2010 |
| CN | 205193390 U | 4/2016 |
| CN | 106094272 A | 11/2016 |
| CN | 106200180 A | 12/2016 |
| JP | H05297415 A | 11/1993 |

* cited by examiner

*Primary Examiner* — Raj R Gupta
(74) *Attorney, Agent, or Firm* — Hauptman Ham, LLP

(57) ABSTRACT

The present disclosure provides an array substrate, the array substrate includes a plurality of array blocks arranged at intervals, wherein each array block includes a plurality of sub-array substrates arranged at intervals, at least one of a periphery of the array substrate, a periphery of the array block, and a periphery of the display area of the sub-array substrate is arranged with an electrostatic protection structure, the electrostatic protection structure is a transparent metal oxide wire, or a metal wire and a transparent conductive metal oxide wire arranged in layers. The existence of the electrostatic protection structure can effectively shield the outside static electricity. The disclosure also provides a liquid crystal display panel adopting the array substrate.

18 Claims, 4 Drawing Sheets

# US 10,345,659 B2

ARRAY SUBSTRATE AND LIQUID CRYSTAL DISPLAY PANEL

RELATED APPLICATIONS

This application is a continuation application of PCT Patent Application No. PCT/CN2017/114018, filed Nov. 30, 2017, which claims the priority benefit of Chinese Patent Application No. CN 201710771654.8, filed Aug. 31, 2017, which is herein incorporated by reference in its entirety.

FIELD OF THE DISCLOSURE

The present disclosure relates to a liquid crystal display technology field, and more particularly to an array substrate and a liquid crystal display panel.

BACKGROUND OF THE DISCLOSURE

In recent years, with the development of display technologies, liquid crystal displays (LCDs) are rapidly gaining popularity due to their unique advantages of high image quality, low power consumption and slim body. Among them, the Thin Film Transistor-Liquid Crystal Display (TFT-LCD) is the most commonly used mainstream liquid crystal display and is widely used in electronic settings such as mobile phones and handheld computers.

TFT-LCD display panels are usually made of large glass cut into small display screens. During the cutting, thinning and handling of the panel, static electricity is easily generated. Static electricity can be easily introduced into the liquid crystal panel to cause electrostatic damage to the internal components of the panel, thereby affecting the display effect and greatly affecting the yield of the product.

SUMMARY OF THE DISCLOSURE

In view of this, the present disclosure provides an array substrate and a liquid crystal display panel having an electrostatic protection structure for effectively shielding external static electricity and improving the antistatic ability of the array substrate and the panel.

The present disclosure provides an array substrate having an electrostatic protection structure, wherein the array substrate includes a plurality of array blocks arranged at intervals, each array block includes a plurality of sub-array substrates arranged at intervals, at least one of a periphery of the array substrate, a periphery of the array block, and a periphery of the display area of the sub-array substrate is arranged with an electrostatic protection structure, the electrostatic protection structure is a transparent metal oxide wire, or a metal wire and a transparent conductive metal oxide wire stacked in layers.

Preferably, the electrostatic protection structure is enclosed around the periphery of the array substrate, the periphery of each array block, and the periphery of the display area of each sub-array substrate. In this way, static electricity can be well prevented from entering the signal lines and the display area during transportation, cutting and thinning of the substrate and the panel including the substrate, so that better electrostatic protection can be achieved on the substrate.

Wherein the electrostatic protection structure is a closed ring or an intermittent ring.

Wherein a material of the transparent conductive metal oxide wire is selected from one of indium tin oxide (ITO), indium zinc oxide (IZO), aluminum-doped zinc oxide (AZO), fluorine-doped tin dioxide (FTO) and phosphorus-doped tin dioxide (PTO).

Wherein the array substrate includes a base substrate, and a buffer layer, a gate insulating layer, an interlayer insulating layer and a protective layer sequentially arranged on the base substrate, wherein the electrostatic protection structure is arranged on the protective layer; and the electrostatic protection structure is a transparent metal oxide wire.

In this case, using the annular transparent conductive metal oxide wire as an electrostatic protection structure can surround at least one of the periphery of the array substrate, the periphery of each array block, and the periphery of the display region of each sub-array substrate. The transparent conductive metal material has high conductivity and good conductivity. In this way, the substrate and the panel including the substrate can be well shielded from static electricity during transportation, cutting and thinning to prevent the static electricity from entering the signal lines and the display area, thereby achieving better electrostatic protection.

Further, the thickness of the electrostatic protection structure is 200-5000 Å, preferably 200-1000 Å. More preferably 500 Å.

wherein the array substrate includes a base substrate, and a buffer layer, a gate insulating layer, an interlayer insulating layer and a protective layer sequentially arranged on the base substrate, wherein a metal layer is further arranged between the interlayer insulating layer and the protective layer, a transparent conductive layer is further arranged on the protective layer, the protective layer has a via hole, the transparent conductive layer and the metal layer are electrically connected through the via hole, and the transparent conductive layer and the metal layer constitute the electrostatic protection structure; the electrostatic protection structure is a metal wire and a transparent conductive metal oxide wire which are stacked in layers. The transparent conductive metal oxide wire and the transparent conductive layer are made of the same material.

In this case, the transparent conductive layer and the metal layer are electrically connected in the up-down direction through the via holes in the protective layer to jointly form the electrostatic protection structure, the electrostatic protection structure is equivalent to the transparent conductive layer and the metal layer connected in parallel, which is better than the conductivity when the annular transparent conductive layer is used alone, and has the better anti-static impact effect. Moreover, at least one of the periphery of each array block and the periphery of the display area of each sub-array substrate is arranged around the periphery of the array substrate, so that the substrate can be better protected from electrostatic damage.

Specifically, the metal layer is a closed ring or an intermittent ring; and the transparent conductive layer is a closed ring or an intermittent ring.

Wherein a thickness of the metal layer is 1000-4000 Å.

Wherein the metal layer is one or more coating layers made of at least one of Mo, Ti, Cu, Cr and Al.

A second aspect of the present disclosure provides a liquid crystal display panel, including the array substrate according to the first aspect of the present disclosure.

BRIEF DESCRIPTION OF THE DRAWINGS

To describe the technical solutions in the embodiments of the present disclosure or in the prior art more clearly, the following briefly introduces the accompanying drawings required for describing the embodiments or the prior art.

DETAILED DESCRIPTION OF PREFERRED EMBODIMENTS

The technical solutions in the embodiments of the present disclosure will be described clearly and completely below with reference to the accompanying drawings and embodiments. Apparently, the described embodiments are merely some but not all of the embodiments of the present disclosure. It should be noted that the specific embodiments described herein are only used to explain the present disclosure, and are not intended to limit the present disclosure.

Figure 1:
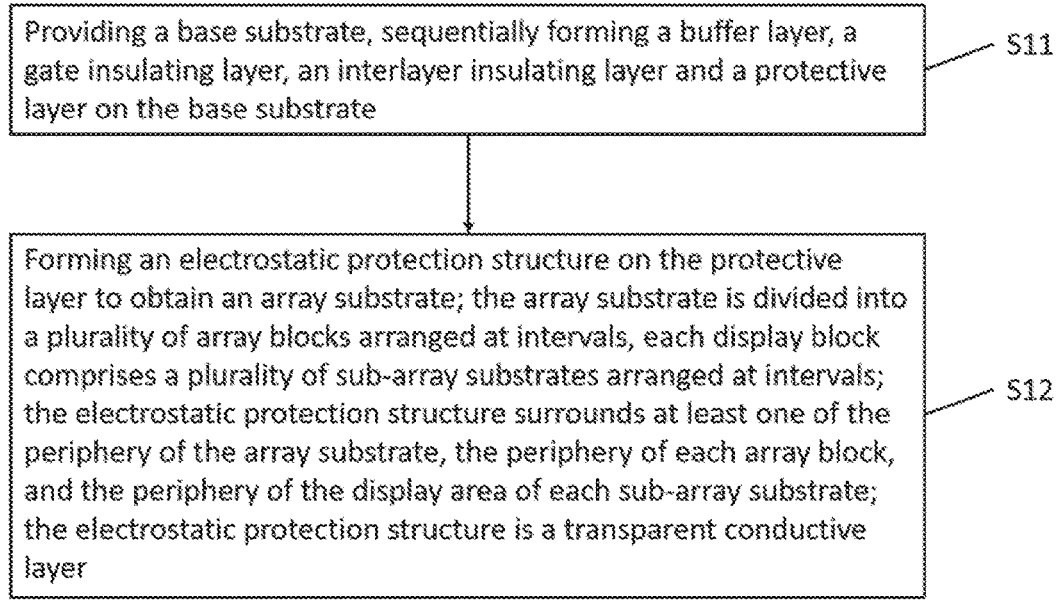
FIG. 1 is a flow chart of a manufacturing method of an array substrate with an electrostatic protection structure according to an embodiment of the present disclosure.
Figure 2:
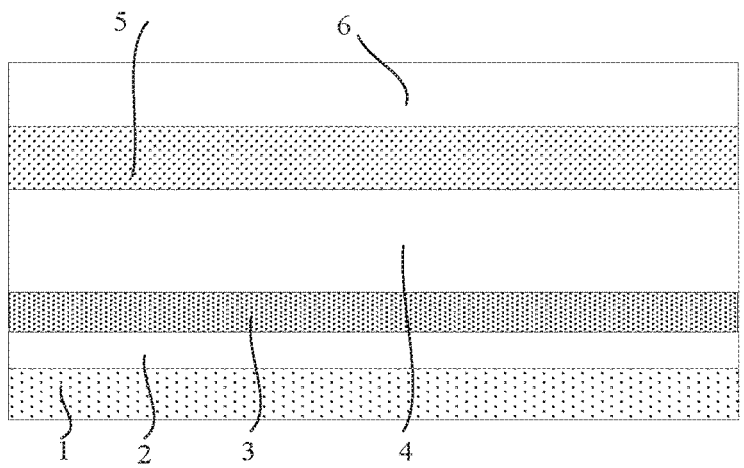
FIG. 2 is a schematic cross-sectional view of an array substrate with an electrostatic protection structure according to Embodiment 1 of the present disclosure.

According to an embodiment of the present disclosure, a first aspect provides a manufacturing method of an array substrate with an electrostatic protection structure. Referring to FIG. 1 and FIG. 2 together, the method includes the following steps:

S11, providing a base substrate 1, sequentially forming a buffer layer 2, a gate insulating layer 3, an interlayer insulating layer 4 and a protective layer 5 on the base substrate 1;

S12, forming an electrostatic protection structure 6 on the protective layer 5 to obtain an array substrate; the array substrate is divided into a plurality of array blocks arranged at intervals, each display block includes a plurality of sub-array substrates arranged at intervals; the electrostatic protection structure surrounds at least one of the periphery of the array substrate, the periphery of each array block, and the periphery of the display area of each sub-array substrate. The electrostatic protection structure 6 is a transparent conductive layer, specifically a transparent metal oxide wire.

In S11 in the present embodiment, the base substrate 1 is made of glass or plastic. A buffer layer 2 covering the base substrate 1 is formed on the base substrate 1 by a deposition process such as plasma enhanced chemical vapor deposition (PECVD). The buffer layer 2 can shield the defects on the base substrate 1 from defects caused by devices or coatings. Optionally, the material of the buffer layer 2 includes at least one of silicon nitride and silicon oxide. Further optionally, the buffer layer 2 can be a single layer of silicon oxide (SiOx) or silicon nitride (SiNx), or a composite layer of silicon oxide (SiOx) and silicon nitride (SiNx). Preferably, the buffer layer 2 is a silicon nitride film and a silicon oxide film sequentially deposited. Optionally, the buffer layer 2 has a thickness of 500-5000 Å, for example 2000, 3000, 4000 or 4500 Å.

In the present embodiment, a patterned gate insulating layer 3 can be formed on the buffer layer 2 through a patterning process, the patterning process includes a process of coating, masking, exposing, developing, etching, and the like. (which may also be referred to as a photolithography process). Optionally, the material of the gate insulating layer 3 includes at least one of silicon nitride and silicon oxide. Further optionally, the material of the gate insulating layer 3 may be a single layer of silicon nitride (SiNx) or a single layer of silicon oxide (SiOx) or a layer of silicon oxide (SiOx) and silicon nitride (SiNx). Preferably, the material of the gate insulating layer 3 is silicon oxide. Optionally, the gate insulating layer 3 has a thickness of 500-2000 Å, preferably 100-2000 Å. For example, the thickness of the gate insulating layer 3 may be 1000 Å, 1200 Å, 1500 Å, 1700 Å or 2000 Å.

A patterned interlayer insulating layer 4 may be formed on the gate insulating layer 3 by a patterning process, and the patterning process includes a process of coating, masking, exposing, developing, etching, and the like. Optionally, the material of the interlayer insulating layer 4 includes at least one of silicon nitride and silicon oxide. Further optionally, the material of the interlayer insulating layer 4 can be a single layer of silicon nitride (SiNx) or a single layer of silicon oxide (SiOx), or a stack of silicon oxide (SiOx) and silicon nitride (SiNx). Preferably, the material of the interlayer insulating layer 4 may be a laminated material formed of silicon oxide (SiOx) and silicon nitride (SiNx). Optionally, the thickness of the interlayer insulating layer 4 is 500-5000 Å, preferably 2000-5000 Å. For example, the thickness of the interlayer insulating layer 4 may be 2000 Å, 2500 Å, 3000 Å, 3500 Å, 4000 Å, 4500 Å, 5000 Å.

The patterned protective layer 5 may be formed on the interlayer insulating layer 4 through a patterning process including a process of coating, masking, exposing, developing, etching, and the like. Optionally, the protective layer 5 has a thickness of 500-3000 Å. The material of the protective layer 5 can be silicon nitride, silicon dioxide or the like.

In step S12, the electrostatic protection structure 6 may be formed on the protective layer 5 through a patterning process including a process of coating, masking, exposing, developing, etching, and the like. The electrostatic protection structure 6 is a transparent conductive layer. Optionally, the material of the transparent conductive layer is one selected from the group consisting of indium tin oxide (ITO), indium zinc oxide (IZO), aluminum-doped zinc oxide (AZO), fluorine-doped tin dioxide (FTO) and phosphorus-doped tin dioxide (PTO). The material of the electrostatic protection structure 6 is preferably ITO. ITO material because of its high conductivity and has good electrical conductivity and light transmittance, electrostatic shielding can be effective.

FIG. 2 is a schematic cross-sectional view of an array substrate with an electrostatic protection structure according to Embodiment 1 of the present disclosure, the array substrate is prepared by the method shown in FIG. 1 described above. The structures shown in FIG. 2 all refer to the cross-sectional view of the array substrate in the periphery of the substrate instead of the schematic diagram of the array substrate including the display area. The buffer layer 2, the gate insulating layer 3, the interlayer insulating layer 4 and the protective layer 5 are arranged in the display area of the array substrate. However, the patterned transparent conductive layer 6 is only arranged in the display area of the array substrate and serves as the pixel electrode. In the longitudinal direction, the transparent conductive layer 6 generally does not exist at the periphery of the array substrate, the periphery of the array region and the like. However, in the embodiment of the present disclosure, when a transparent conductive layer such as ITO on the array substrate is patterned, a portion of the ITO layer remains in the periphery of the array substrate, the periphery of the array region and the like, and make it as a ring structure, such a highly conductive annular transparent conductive layer 6 can play a better electrostatic shielding effect. It can be seen that the manufacturing process of the electrostatic protection structure 6 provided in the embodiment of the present disclosure does not add a new process to the manufacturing process of the existing array substrate.

Wherein, the shape of the electrostatic protection structure 6 (i.e., the transparent conductive layer 6) is annular, preferably rectangular. Electrostatic protective structure 6 is a closed ring or an intermittent ring. A closed ring structure is preferred.

Figure 3:
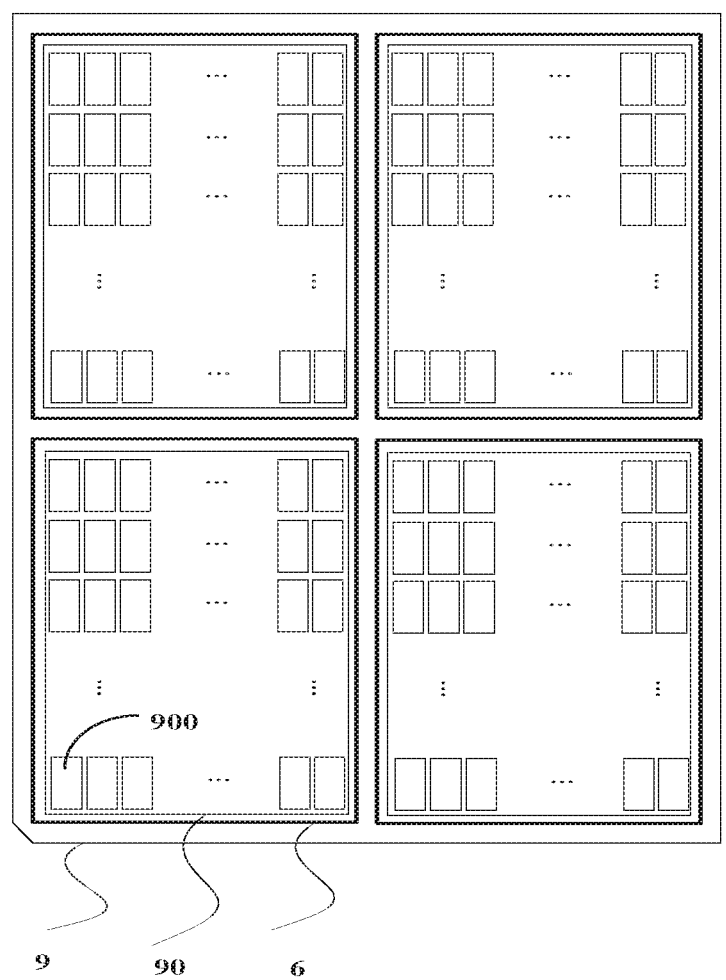
FIG. 3 is a schematic plan view of an array substrate with an electrostatic protection structure according to Embodiment 1 of the present disclosure.

FIG. 3 is a schematic plan view of an array substrate with an electrostatic protection structure according to Embodiment 1 of the present disclosure. As shown in FIG. 3, the array substrate 9 is divided into a plurality of array blocks 90 arranged at intervals, each display block 90 includes a plurality of sub-array substrates 900 arranged at intervals, the plurality of sub-array substrates 900 are generally spaced apart by a ring-shaped cutting line so that the lately large array substrate 9 and the color filter substrate are bonded together vertically and then cut along the cutting lines to form a plurality of liquid crystal display sub-panels.

In FIG. 3, the electrostatic protection structure 6 surrounds the periphery of a plurality of array blocks 90, and the electrostatic protection structure 6 is a closed ring. In this case, the thickness of the electrostatic protection structure 6 (i.e., the transparent conductive layer 6) may be 200-1000 Å; and its inner diameter (or "width") may be 2-100 μm.

Figure 4:
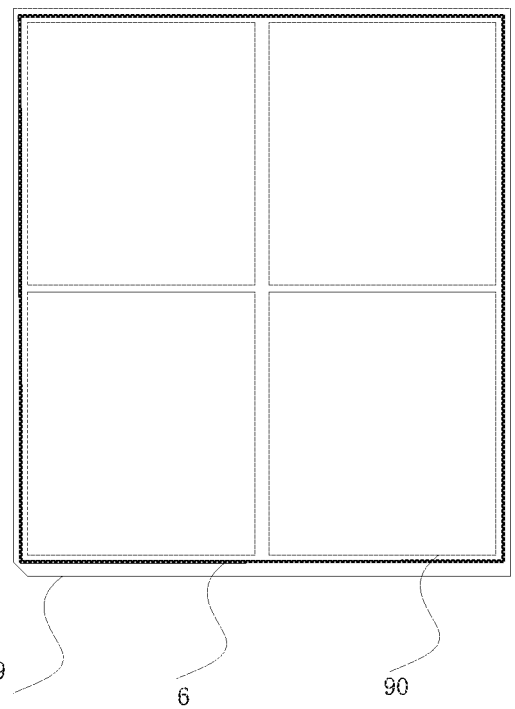
FIG. 4 is a schematic plan view of an array substrate with an electrostatic protection structure according to Embodiment 2 of the present disclosure.

FIG. 4 is a schematic plan view of an array substrate with an electrostatic protection structure according to Embodiment 2 of the present disclosure. In FIG. 4, the electrostatic protection structure 6 is arranged around the periphery of the array substrate 9 (or referred to as the edge and the periphery), and the electrostatic protection structure 6 is a closed ring. In this case, the thickness of the electrostatic protection structure 6 (i.e., the transparent conductive layer 6) may be 200-1000 Å; and its inner diameter (or "width") may be 2-100 μm.

Figure 5:
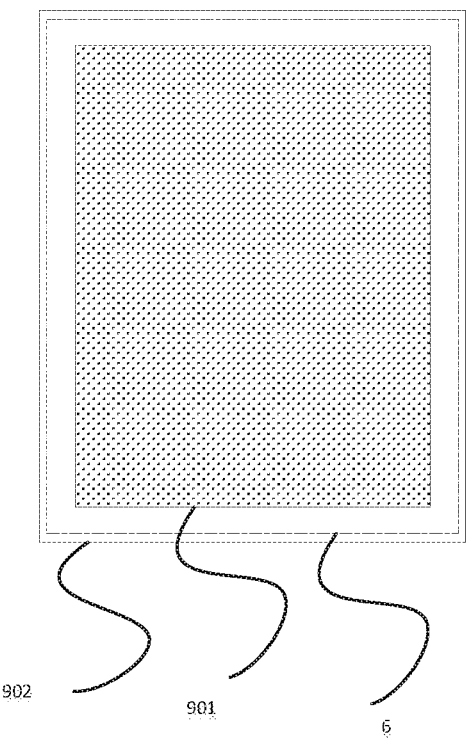
FIG. 5 is a schematic plan view of an array substrate with an electrostatic protection structure according to Embodiment 3 of the present disclosure.
Figure 6:
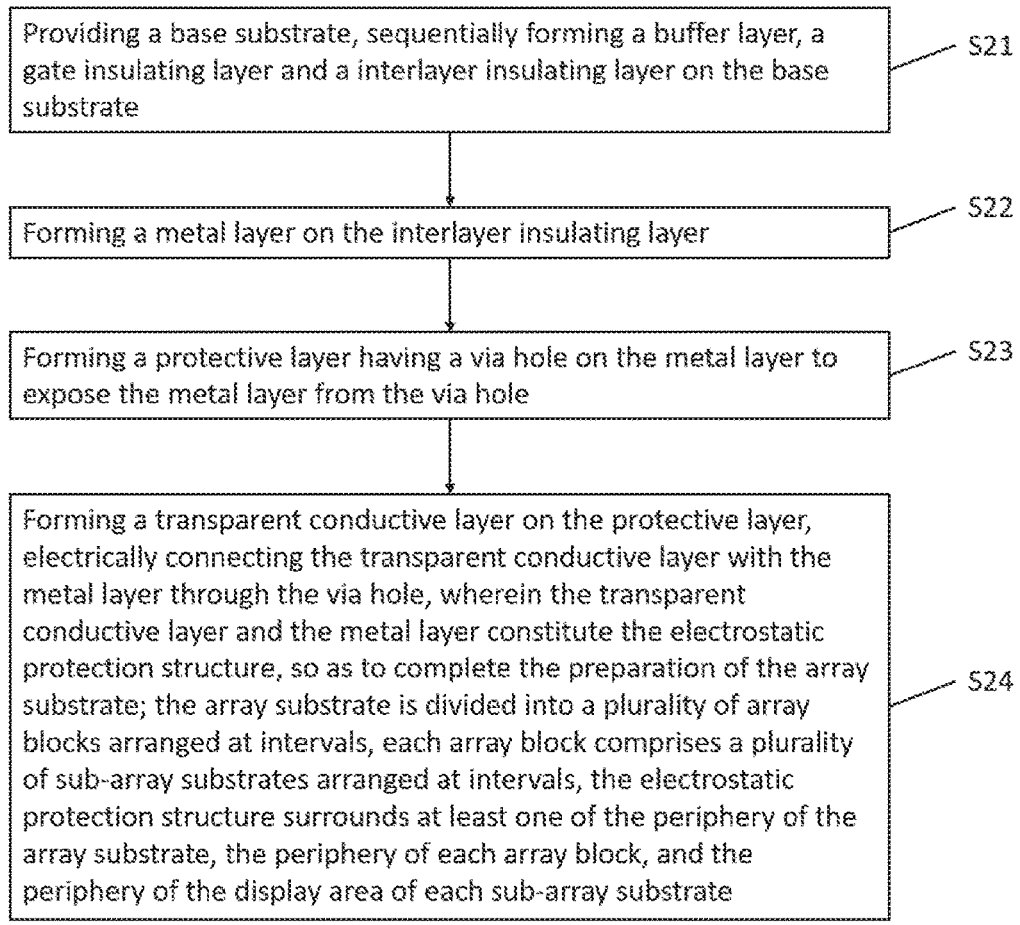
FIG. 6 is a flow chart of a manufacturing method of an array substrate with an electrostatic protection structure according to Embodiment 1 of the present disclosure.

FIG. 5 is a schematic plan view of an array substrate with an electrostatic protection structure according to Embodiment 3 of the present disclosure. In FIG. 5, the periphery of the display area 901 of the array substrate (or the periphery and the periphery) of the array substrate is surrounded by the electrostatic protection structure 6. The electrostatic protection structure 6 is an intermittent ring. In this case, the thickness of the electrostatic protection structure 6 (i.e., the transparent conductive layer 6) is 200-1000 Å; and its inner diameter (or "width") is 2-100 μm. The plurality of sub-array substrates is generally separated by a ring-shaped cutting line 902, so that the array substrate of the later stage is aligned with the color filter substrate up and down and cut along the cutting line to form a plurality of liquid crystal display sub-panels.

In other embodiments of the present disclosure, the electrostatic protection structure 6 may be arranged around the periphery of the array substrate 9, the periphery of each of the array blocks 90, and the periphery of the display region of each array sub-substrate 900. In this manner, static electricity can be well prevented from entering the signal lines and the display area of the substrate during transportation, cutting and thinning of the substrate and the panel including the substrate later, so as to achieve better electrostatic protection of the substrate.

According to a second aspect of the embodiments of the present disclosure, an array substrate with an electrostatic protection structure is provided. The array substrate with the electrostatic protection structure is prepared by the manufacturing method of the array substrate with the electrostatic protection structure described in the first aspect. The structure of the obtained array substrate can be referred to FIG. 2 to FIG. 6 together.

A third aspect of the present disclosure provides a manufacturing method of an array substrate with an electrostatic protection structure. Please refer to FIG. 6 and FIG. 7 together with the following steps:

S21, providing a base substrate 1, sequentially forming a buffer layer 2, a gate insulating layer 3 and an interlayer insulating layer 4 on the base substrate 1;

S22, forming a metal layer 61 on the interlayer insulating layer 4;

S23, forming a protective layer 5' having a via hole on the metal layer 61 to expose the metal layer 61 from the via hole;

S24, forming a transparent conductive layer 62 on the protective layer 5', electrically connecting the transparent conductive layer 62 with the metal layer 61 through the via hole, wherein the transparent conductive layer 62 and the metal layer 61 constitute the electrostatic protection structure, so as to complete the preparation of the array substrate; the array substrate is divided into a plurality of array blocks arranged at intervals, each array block includes a plurality of sub-array substrates arranged at intervals, the electrostatic protection structure surrounds at least one of the periphery of the array substrate, the periphery of each array block, and the periphery of the display area of each sub-array substrate. More specifically, the electrostatic protection structure is a metal wire and a transparent conductive metal oxide wire which are stacked in layers.

The operation of step S21 in the present embodiment is similar to step S11 described above, and details are not described herein again.

In S22, the metal layer 61 may be formed by a patterning process including a process of coating, masking, exposing, developing, etching, and the like. The metal layer 61 has a thickness of 1000-4000 Å. The metal layer 61 may be one or more layers. When the metal layer 61 has a one-layer structure, the material of the metal layer 61 may be metal Mo, Ti, Cu, Cr, or Al. When the metal layer 61 is a multi-layer structure, it may be a multi-layer metal layer composed of at least two of Mo, Ti, Cu, Cr, and Al. For example, it may be a copper film layer and a Ti layer that are laminated.

The protective layer 5' with a via hole in S23 can be realized by the following process: a protective film formed by a single patterning process on a base substrate which the metal layer 61 is formed, and a via hole penetrating through the protective film is dry-etched by a photolithography process to expose the metal layer 61. The etching gas used for the dry etching includes fluorine-containing gas and hydrogen gas. Optionally, the flow ratio of the fluorine-containing gas to the hydrogen gas is 5-15:1. Further optionally, the flow ratio of the fluorine-containing gas to the hydrogen gas is 10:1. Optionally, the flow rate of the fluorine-containing gas is 100 sccm to 500 sccm. The protective layer 5' has a thickness of 500-3000 Å. The material of the protective layer 5' can be silicon nitride, silicon dioxide or the like.

The formation of the transparent conductive layer 62 in step S24 in the present embodiment is similar to the above step S12. Optionally, the material of the transparent conductive layer 62 is selected from one of indium tin oxide (ITO), indium zinc oxide (IZO), aluminum-doped zinc oxide (AZO), fluorine-doped tin oxide (FTO) and phosphorus-doped tin oxide (PTO). The material of the electrostatic protection structure 62 is preferably ITO. ITO material has a high conductivity and good electrical conductivity and light transmittance. The transparent conductive layer 62 has a thickness of 200-1000 Å.

Figure 7:
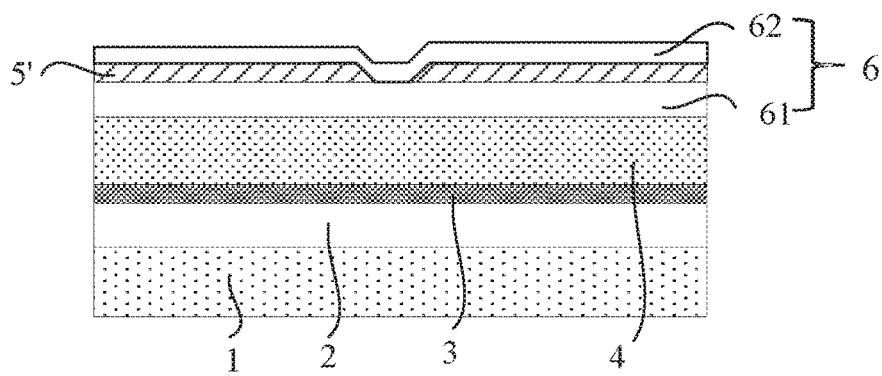
FIG. 7 is a schematic cross-sectional view of an array substrate with an electrostatic protection structure according to Embodiment 4 of the present disclosure.

FIG. 7 is a schematic cross-sectional view of an array substrate having an electrostatic protection structure according to a fourth embodiment of the present disclosure. The array substrate is manufactured by the method shown in FIG. 6. The structures described in FIG. 7 all refer to the cross-sectional view of the array substrate at the periphery of the substrate instead of showing the array substrate including the display area. The buffer layer 2, the gate insulating layer 3, the interlayer insulating layer 4, the protective layer 5', the metal layer 61 and the transparent conductive layer 62 are all arranged in the display area of the array substrate. However, the patterned transparent conductive layer 62 and the metal layer 61 are only arranged in the display area of the array substrate and serve as pixel electrodes. In the vertical direction, the metal layer 61 and the transparent conductive layer 62 generally do not exist at the periphery of the array substrate, the periphery of the array region, or the like. The array substrate of the display area generally includes a base substrate 1, a buffer layer 2, a low-temperature polysilicon layer (having source and drain contact regions at opposite ends thereof), a gate insulating layer 3, a gate layer, an interlayer insulating layer 4, a first metal layer, a source, a drain, a planarization insulating layer, a second metal layer, a patterned transparent conductive layer 62. Wherein the first metal layer is arranged between the gate insulating layer and the interlayer insulating layer to conduct the gate voltage; the second metal layer is arranged between the interlayer insulating layer and the flat layer so as to conduct the pixel voltage. In this case, the second metal layer in the display area corresponds to the metal layer 61 in FIG. 7. It can be seen from this that the manufacturing process of the electrostatic protection structure 6 provided in the embodiment of the present disclosure does not add a new process to the existing manufacturing process of the array substrate.

In this embodiment, the transparent conductive layer 62 and the metal layer 61 are electrically connected in the up-down direction through the via holes in the protective layer 5' to jointly form the electrostatic protection structure 6. In this case, the electrostatic protection structure 6 is equivalent to the parallel transparent conductive layer 62 and the metal layer 61, and the resistance thereof is smaller than the resistance of the transparent conductive layer 62 alone. This makes the electrostatic protection structure 6 have a better antistatic effect. Moreover, at least one of the periphery of each of the array blocks and the periphery of the display area of each of the sub-array substrates is arranged around the periphery of the array substrate (refer to FIGS. 3-5 respectively), and the electrostatic shielding structure 6 can be better prevented from being electrostatically damaged. The metal layer 61 is a closed ring or a discontinuous ring, and the transparent conductive layer 62 is a closed ring or a discontinuous ring.

According to a fourth aspect of the embodiments of the present disclosure, an array substrate having an electrostatic protection structure is provided. The array substrate having the electrostatic protection structure is prepared by the method for manufacturing the array substrate having the electrostatic protection structure described in the second aspect. The structure of the obtained array substrate can be referred to FIG. 7 and FIG. 3 to FIG. 5 together.

A fourth aspect of the embodiments of the present disclosure further provides a liquid crystal display panel to which the array substrate shown in FIG. 1 to FIG. 7 is applied. For the array substrate, please refer to the description of FIG. 1 to FIG. 7 above, and details are not described herein again. In this case, in addition to the above array substrate, the liquid crystal display panel further includes a color filter substrate and a liquid crystal layer and a sealant sandwiched between the array substrate and the color filter substrate. The sealant surrounds the liquid crystal layer. Since the array substrate has an electrostatic protection structure, the static electricity can be well shielded during the transportation, cutting and thinning of the liquid crystal display panel to prevent the static electricity from entering the signal lines and the display area, thereby achieving better electrostatic protection.

It should be noted that, the above-mentioned embodiments may be modified and modified by those skilled in the art based on the disclosure and description of the foregoing specification. Therefore, the present disclosure is not limited to the specific embodiments disclosed and described above, and other equivalent modifications and alterations to the present disclosure should also fall within the protection scope of the present disclosure. In addition, although some specific terms are used in this specification, these terms are merely for convenience of description and do not limit the present disclosure in any way.

What is claimed is:

1. An array substrate, comprising a plurality of array blocks arranged at intervals, wherein each array block comprises a plurality of sub-array substrates arranged at intervals, at least one of a periphery of the array substrate, a periphery of the array block, and a periphery of the display area of the sub-array substrate is arranged with an electrostatic protection structure, the electrostatic protection structure is a transparent metal oxide wire, or a metal wire and a transparent conductive metal oxide wire stack in layers;

wherein the array substrate further comprises a base substrate, and a buffer layer, a gate insulating layer, an interlayer insulating layer and a protective layer sequentially arranged on the base substrate, wherein a metal layer is further arranged between the interlayer insulating layer and the protective layer, a transparent conductive layer is further arranged on the protective layer, the protective layer has a via hole, the transparent conductive layer and the metal layer are electrically connected through the via hole, and the transparent conductive layer and the metal layer constitute the electrostatic protection structure; the electrostatic protection structure is a metal wire and a transparent conductive metal oxide wire which are stacked in layers.

2. The array substrate according to claim 1, wherein the electrostatic protection structure is a closed ring or an intermittent ring.

3. The array substrate according to claim 1, wherein a material of the transparent conductive metal oxide wire is selected from one of indium tin oxide, indium zinc oxide, aluminum-doped zinc oxide, fluorine-doped tin dioxide and phosphorus-doped tin dioxide.

4. The array substrate according to claim 1, wherein the array substrate comprises a base substrate, and a buffer layer, a gate insulating layer, an interlayer insulating layer and a protective layer sequentially arranged on the base substrate, wherein the electrostatic protection structure is arranged on the protective layer; and the electrostatic protection structure is a transparent conductive metal oxide wire.

5. The array substrate according to claim 2, wherein the array substrate comprises a base substrate, and a buffer layer, a gate insulating layer, an interlayer insulating layer and a protective layer sequentially arranged on the base substrate, wherein the electrostatic protection structure is arranged on the protective layer; and the electrostatic protection structure is a transparent conductive metal oxide wire.

6. The array substrate according to claim 3, wherein the array substrate comprises a base substrate, and a buffer layer, a gate insulating layer, an interlayer insulating layer and a protective layer sequentially arranged on the base substrate, wherein the electrostatic protection structure is arranged on the protective layer; and the electrostatic protection structure is a transparent conductive metal oxide wire.

7. The array substrate according to claim 4, wherein a thickness of the electrostatic protection structure is 200-5000 Å.

8. The array substrate according to claim 2, wherein the array substrate comprises a base substrate, and a buffer layer, a gate insulating layer, an interlayer insulating layer and a protective layer sequentially arranged on the base substrate, wherein a metal layer is further arranged between the interlayer insulating layer and the protective layer, a transparent conductive layer is further arranged on the protective layer, the protective layer has a via hole, the transparent conductive layer and the metal layer are electrically connected through the via hole, and the transparent conductive layer and the metal layer constitute the electrostatic protection structure; the electrostatic protection structure is a metal wire and a transparent conductive metal oxide wire which are stacked in layers.

9. The array substrate according to claim 3, wherein the array substrate comprises a base substrate, and a buffer layer, a gate insulating layer, an interlayer insulating layer and a protective layer sequentially arranged on the base substrate, wherein a metal layer is further arranged between the interlayer insulating layer and the protective layer, a transparent conductive layer is further arranged on the protective layer, the protective layer has a via hole, the transparent conductive layer and the metal layer are electrically connected through the via hole, and the transparent conductive layer and the metal layer constitute the electrostatic protection structure; the electrostatic protection structure is a metal wire and a transparent conductive metal oxide wire which are stacked in layers.

10. The array substrate according to claim 1, wherein a thickness of the metal layer is 1000-4000 Å.

11. The array substrate according to claim 8, wherein a thickness of the metal layer is 1000-4000 Å.

12. The array substrate according to claim 9, wherein a thickness of the metal layer is 1000-4000 Å.

13. The array substrate according to claim 8, wherein the metal layer is one or more coating layers made of at least one of Mo, Ti, Cu, Cr and Al.

14. The array substrate according to claim 8, wherein the metal layer is one or more coating layers made of at least one of Mo, Ti, Cu, Cr and Al.

15. A liquid crystal display panel, comprising an array substrate, wherein the array substrate comprises a plurality of array blocks arranged at intervals, each array block comprises a plurality of sub-array substrates arranged at intervals, at least one of a periphery of the array substrate, a periphery of the array block, and a periphery of the display area of the sub-array substrate is arranged with an electrostatic protection structure, the electrostatic protection structure is a transparent metal oxide wire, or a metal wire and a transparent conductive metal oxide wire stacked in layers;

wherein the array substrate further comprises a base substrate, and a buffer layer, a gate insulating layer, an interlayer insulating layer and a protective layer sequentially arranged on the base substrate, wherein a metal layer is further arranged between the interlayer insulating layer and the protective layer, a transparent conductive layer is further arranged on the protective layer, the protective layer has a via hole, the transparent conductive layer and the metal layer are electrically connected through the via hole, and the transparent conductive layer and the metal layer constitute the electrostatic protection structure; the electrostatic protection structure is a metal wire and a transparent conductive metal oxide wire which are stacked in layers.

16. The liquid crystal display panel according to claim 15, wherein the array substrate comprises a base substrate, and a buffer layer, a gate insulating layer, an interlayer insulating layer and a protective layer sequentially arranged on the base substrate, wherein the electrostatic protection structure is arranged on the protective layer; and the electrostatic protection structure is a transparent conductive metal oxide wire.

17. The liquid crystal display panel according to claim 16, wherein a thickness of the electrostatic protection structure is 200-5000 Å.

18. The liquid crystal display panel according to claim 15, wherein the metal layer is one or more coating layers made of at least one of Mo, Ti, Cu, Cr and Al.

* * * * *